(12) United States Patent
Dultz et al.

(10) Patent No.: US 6,181,407 B1
(45) Date of Patent: Jan. 30, 2001

(54) ELECTRO-OPTICAL MATERIAL HAVING A LAMELLAR LIQUID CRYSTAL STRUCTURE

(75) Inventors: Wolfgang Dultz, Frankfurt (DE); Leonid Beresnev, Moscow (RU); Ashok Bizadar, New Delhi (IN); Wolfgang Haase, Reinheim (DE)

(73) Assignee: Deutsche Telekom AG, Bonn (DE)

(*) Notice: Under 35 U.S.C. 154(b), the term of this patent shall be extended for 0 days.

(21) Appl. No.: 08/880,812

(22) Filed: Jun. 23, 1997

(30) Foreign Application Priority Data

Jun. 21, 1996 (DE) .............................................. 196 24 769

(51) Int. Cl.[7] ....................................................... G02F 1/13
(52) U.S. Cl. ............................ 349/172; 349/171; 349/183; 349/184; 252/299.01; 252/299.65; 428/1
(58) Field of Search .................................... 349/172, 171, 349/183, 184; 252/299.01, 299.65; 428/1

(56) References Cited

U.S. PATENT DOCUMENTS

| | | | |
|---|---|---|---|
| 4,367,924 | 1/1983 | Clark et al. | 350/330 |
| 4,563,059 | 1/1986 | Clark et al. | 350/330 |
| 4,838,663 | 6/1989 | Lagerwall et al. | 350/330 |
| 5,453,218 | * 9/1995 | Wand et al. | 252/299.01 |
| 5,462,695 | * 10/1995 | Tsai et al. | 252/299.65 |
| 5,620,756 | * 4/1997 | Bach et al. | 428/1 |
| 5,866,036 | * 2/1999 | Wand et al. | 252/299.6 |
| 6,046,789 | * 4/2000 | Funfschling et al. | 349/172 |

FOREIGN PATENT DOCUMENTS

| | | |
|---|---|---|
| 39 11 620 | 10/1990 | (DE) . |
| 40 38 498 | 6/1992 | (DE) . |
| 41 37 408 | 5/1993 | (DE) . |
| 43 12 633 | 10/1993 | (DE) . |
| 43 07 769 | 9/1994 | (DE) . |
| 3-251392 | 4/1993 | (JP) . |
| 7-286179 | * 10/1995 | (JP) . |

OTHER PUBLICATIONS

Garoff et al., "Electroclinic Effect at the A–C Phase Change in a Chiral Smectic Liquid Crystal," Physical Review Letters, vol. 38, No. 15, pp. 848–851, Apr. 11, 1977.
Anderson et al., "Smectic A Materials with 11.25 Degrees Induced Tilt Angle for Full Gray Scale Generation," Ferroelectrics, 1991, vol. 114, pp. 137–150.
Davey et al., "Potential and Limitations of the Electroclinic Effect in Device Applications," Ferroelectrics, 1991, vol. 114, pp. 101–112.
Miyasato et al., "Direct Method with Triangular Waves for Measuring Spontaneous Polarization in Ferroelectric Liquid Crystals," Japanese Journal of Applied Physics, vol. 22, No. 10, Oct., 1983, pp. L661–L663.
Baikalov et al., "Measures of the Molecular Tilt Angle and Optical Anisotropy in Ferroelectric Liquid Crystals," Mol. Cryst. Liq. Cryst., 1984, vol. 127, pp. 397–406.

* cited by examiner

Primary Examiner—Kenneth Parker
Assistant Examiner—Julie Ngo
(74) Attorney, Agent, or Firm—Kenyon & Kenyon

(57) ABSTRACT

An electro-optic material that is characterized by short reaction times when working with a low drive voltage. For that, the electro-optic material has a lamellar liquid crystal (10), which contains one or more components and into which chiral molecules (20), whose longitudinal axes (m) are longer than the longitudinal axes of the molecules (10) forming the lamellar liquid crystal, are introduced at a predefined concentration, so that the longitudinal axes (m) of the chiral molecules (20) are tilted, without an external electric field, statistically by a predefined angle ($\theta_m$) toward the normal (z) of the layer of the lamellar liquid crystal (10).

6 Claims, 11 Drawing Sheets

80BPh4+

80BPhPm7

ELECTRO-OPTICAL MATERIAL HAVING A LAMELLAR LIQUID CRYSTAL STRUCTURE

FIELD OF THE INVENTION

The present invention relates to an electro-optic material for modulating light, whose optical properties are able to be changed by applying an external electric field.

RELATED TECHNOLOGY

Ferroelectric liquid crystals used as electro-optic material for manufacturing optically active elements for information processing are known. Optically active elements of this kind are, for example, switches, fiber optic channels, dimmers operated at low voltages or modulators in the microsecond range, quick-reacting, optical delay elements, etc.

U.S. Pat. Nos. 4,367,924 and 4,563,059 describe a ferroelectric, liquid crystalline material having a chiral smectic C-phase, which has been used to produce a surface-stabilized, ferroelectric liquid crystal, abbreviated SSFLC, component. The optical state of the described liquid crystalline material is changed by applying an external electric field. For that, the longitudinal axes of the tilted liquid crystal molecules orient themselves in a preferred direction to the polarity of the applied electric field, collectively on a conical surface having an opening or cone angle, which corresponds to double the angle of inclination of the smectic C-phase of the liquid crystal. As a result of the collective reorientation of the longitudinal molecule axes in the smectic C-phase, the reaction time, that is the optical switching time of the liquid crystal, is relatively long in the SSFLC component. It may be that the reaction time is able to be shortened, as a general principle, by increasing the drive voltage; however, higher voltages are precluded because of the necessary small layer thickness of the material of about 1.5 $\mu$m.

U.S. Pat. No. 4,838.663 describes a ferroelectric, liquid crystalline material having a chiral, orthogonal, smectic A-phase which has been used in what is known as a "bookshelf" arrangement. The reaction time of this material in the micro- and submicro-second range in response to an applied electric field is, in fact, shorter and is only minimally dependent on the applied voltage. The optical response is small, though. When the electric field is applied, the longitudinal axes of the molecules, such as the longitudinal axes of the molecules of the liquid crystal having a chiral smectic C-phase, orient themselves to the polarity of the electric field, collectively in a preferred direction. However, the change in the optical state takes place in this case as a result of the collective tilting of the longitudinal molecule axes normal to the direction of the electric field. This is also known as electroclinic effect, and was described by S. Garoff and R. B. Meyer in Phys. Rev. Let., vol. 38, p. 848 (1977).

SUMMARY OF THE INVENTION

An object of the present invention is to create an electro-optic material whose optical switching time is lower than or is in the range of the fastest conventional ferroelectric liquid crystals, but requires clearly lower drive voltages.

The present invention therefore provides an electro-optic material, whose optical properties are able to be changed by applying an external electric field, characterized by a lamellar liquid crystal (10), which contains one or more components and into which chiral molecules (20), whose longitudinal axes (m) are longer than the longitudinal axes of the molecules (10) forming the lamellar liquid crystal, are introduced at a predefined concentration, so that the longitudinal axes (m) of the chiral molecules (20) are tilted, without an external electric field, statistically by a predefined angle ($\theta_m$) toward the normal (z) of the layer of the lamellar liquid crystal.

The present invention further may provide that each chiral molecule (20) has at least one chiral center with a dipole element (30), which is disposed transversely to the layer normal (z) and which assumes a preferred direction in response to the application of an external electric field. Moreover, the lamellar liquid crystal (10) may be in a thermotropic smectic phase, in an orthogonal smectic phase, and in achiral or chiral smectic C-phase.

The inherent drawback of the two ferroelectric, liquid crystalline materials mentioned is that the change in their optical properties in response to an applied electric field has a relationship with a collective reorientation of the longitudinal axes of the liquid crystal molecules, and with a spontaneous polarization. The present invention creates an electro-optic material, whose electro-optic properties are characterized more by a reorientation of individual molecules than by a collective reorientation. For that, the electro-optic material comprises a lamellar liquid crystal, which contains one or more components and into which chiral molecules are introduced at a predefined concentration. The chiral molecules are dissolved in the lamellar liquid crystal. The longitudinal axes of the chiral molecules used as dopants are longer than the longitudinal axes of the molecules forming the lamellar liquid crystal, so that they are tilted, without an external electric field, statistically by a predefined angle, toward the normal of the layer of the lamellar liquid crystal.

The expression "lamellar liquid crystal" found in the claims and throughout the specification is understood to be a liquid crystal that is built up in a layered structure and that can be in an achiral or chiral, orthogonal smectic A-phase, a tilted smectic C-phase or in a lyotropic phase. Moreover, the lamellar liquid crystal can have a low-molecular or polymer structure. The lamellar liquid crystal can also consist of chiral compounds.

Each chiral molecule has at least one chiral center with a dipole element, which is disposed transversely to the layer normal and which assumes a preferred direction in response to the application of an external electric field. Due to this measure, the liquid-crystal molecules are no longer collectively reoriented in response to an applied external electric field, rather, for the most part, it is the chiral molecules introduced as dopant into the lamellar liquid crystal that are reoriented.

BRIEF DESCRIPTION OF THE DRAWING

The present invention is elucidated in the following by way of example, on the basis of a specific embodiment and in connection with the enclosed drawing, whose Figures show.

DETAILED DESCRIPTION

Figure 1:
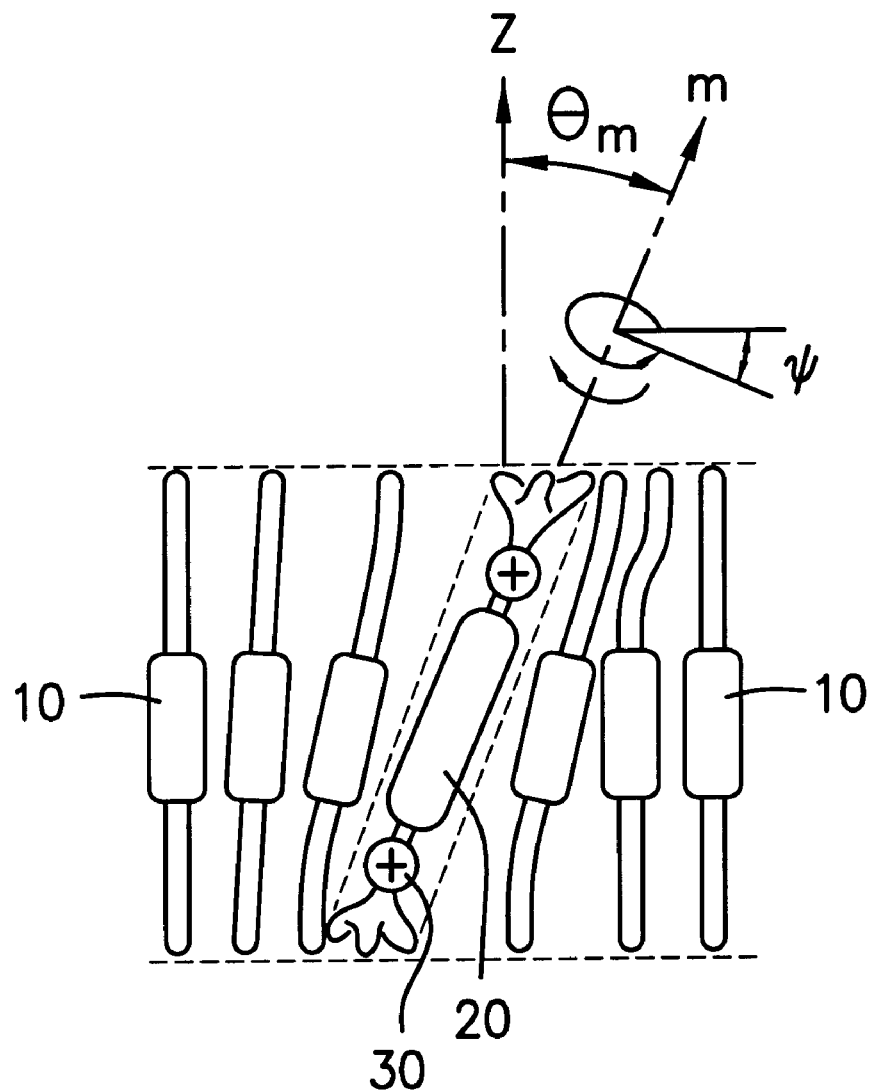
FIG. 1 in a side view, a greatly simplified detail of a layer of an electro-optic material according to the present invention, with a chiral molecule introduced into the lamellar liquid crystal.
Figure 2A:
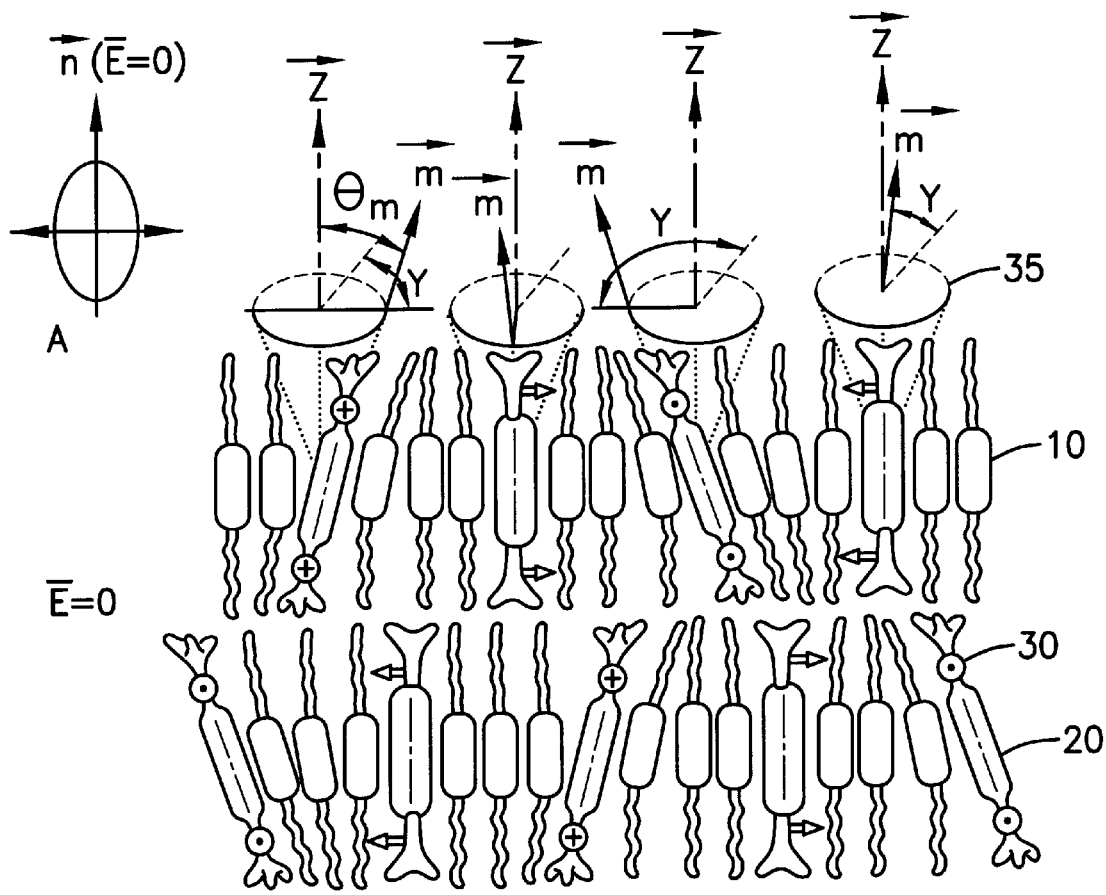
FIGS. 2a, 2b, 2c two layers of the electro-optic material according to the present invention, as well as the orientation of the chiral molecules introduced into the lamellar liquid crystal, without an applied electric field, with a negative or a positive external electric field.

FIG. 1 illustrates a section of a single layer of a lamellar, i.e., layer-type liquid crystal having molecules 10. Introduced into the lamellar liquid crystal are chiral, tilted molecules 20, only one of these being shown in FIG. 1 for the sake of simplicity. With the layer normal z of the lamellar liquid crystal, the molecular longitudinal axis m ("long axis") of chiral molecule 20 forms an angle of inclination $θ_m$ which is able to be selectively adjusted. The only chiral molecule shown in FIG. 1 has two transverse dipole moments 30, in conformance with the number of chiral centers. The two transverse dipole moments 30 are preferably oriented within the layers of the liquid crystal and normal to the plane extending from layer normal z and longitudinal axis m of chiral molecule 20. The plus sign indicates that the dipole moment points transversely into the layer plane. The short molecular axis and transverse dipole moments 30 of tilted chiral molecule 20 are so arranged to prevent a vibratory motion ψ about the longitudinal axis of the chiral molecule. This prevention has a connection with the tilted molecules being monoclinically surrounded by chiral centers. Since the longitudinal axis m of chiral molecule 20 introduced into the lamellar liquid crystal is longer than the longitudinal axes of molecules 10 forming the lamellar liquid crystal, longitudinal axis m of chiral molecule 20 is tilted by angle $θ_m$ relative to layer normal z. In the field-free state, i.e., when no external electric field is applied, the inclination planes of chiral molecules 20 are statistically oriented about the surface of a cone 35 (see FIG. 2a). As is apparent from FIG. 2a, transverse dipole moments 30 of chiral molecules 20 point in any directions at all transversely to layer normal z.

The optical properties of the electro-optic material can be described both in the field-free state, as well as when an electric field is applied, by the longitudinal axis n(E) of a refractive index ellipsoid relative to layer normal z. Without an applied electric field, the optical state both of one layer as well as of all layers of the lamellar liquid crystal with the introduced chiral molecules 20 can be described by a uniaxial (optically uniaxial) refractive index ellipsoid "A". The ellipsoid is characterized by longitudinal axis n(E=0), which is oriented along layer normal z (see FIG. 2a). The inclination planes of chiral molecules 20 are defined by azimuth angle Ψ, which, as already mentioned, is statistically distributed without an external electric field (see FIG. 2a).

Figure 2B:
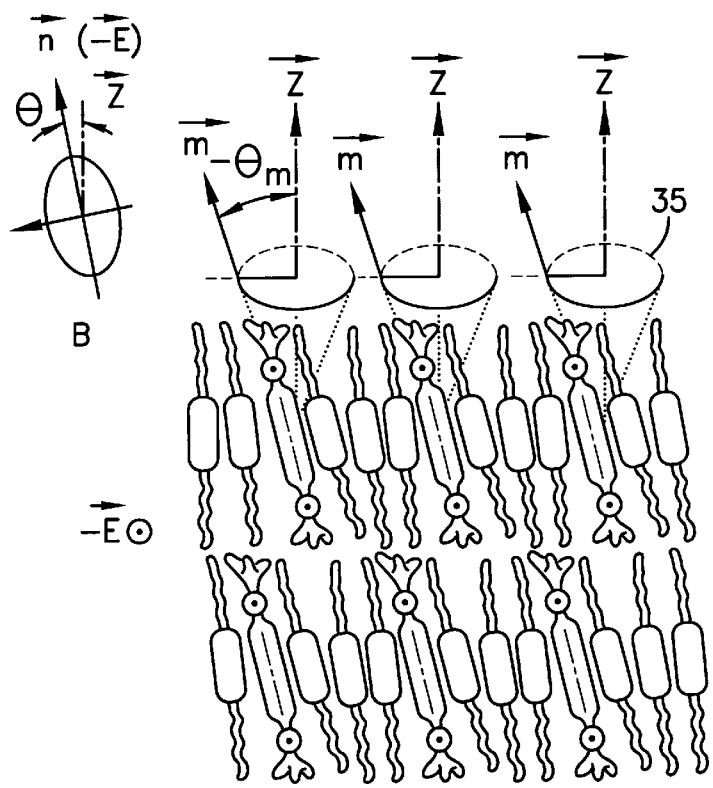
Figure 2C:
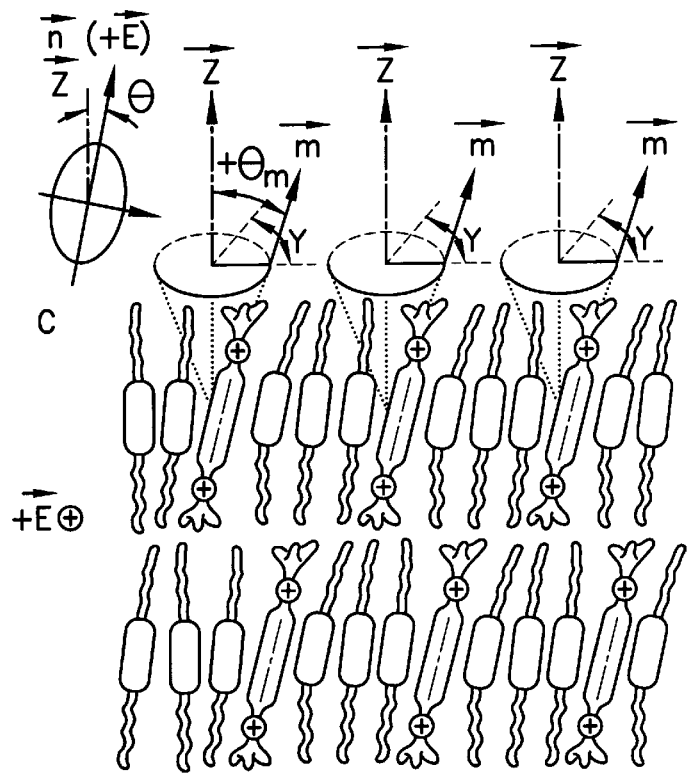

If an electric field having negative polarity is applied along the layers, i.e., transversely to the normal z of the layer, transverse dipole moments 30 of chiral molecules 20 orient themselves parallel to the electric field, as shown in FIG. 2b. In FIG. 2c, the alignment of transverse dipole moments 30 of chiral molecules 20 are shown in the case of an electric field with positive polarity. The optical properties of the electrooptic material, which is under the influence of an external electric field, are able to be described by a slightly biaxial (optically biaxial) ellipsoid for the refractive index (see "B" in FIG. 2b and "C" in FIG. 2c), whose longitudinal optical axis n(E) deviates by angle θ from layer normal z in the plane normal to the electric field. The slight biaxiality occurs because the optical properties result from the superposing of the properties of tilted chiral molecules 20 and of the properties of the less tilted or not tilted molecules 10 of the orthogonal liquid crystal. Inclination angles θ and $θ_m$ are determined by the operational sign (positive or negative) of the electric field.

The electro-optic material of the present invention makes it possible to achieve the switching or response times achieved with components having conventional ferroelectric liquid crystals, with clearly lower switching voltages. To obtain a modulation depth of 15 to 20% or an angle of inclination θ of 5 to 7° when working with a switching time of 2 to 4 μs, merely a 10 V voltage is needed for a cell thickness of 1.5 μm. In comparison, for comparable response times, the switching voltage in components based on the electroclinic effect amounts to 50 V and more (G. Andersson, I. Dahl, L. Komitov, M. Matuszczyk, S. T. Lagerwall, K. Skarp, B. Stebler, D. Coates, M. Chambers and D. M. Walba "Smectic A* Materials with 11.25 Degrees Induced Tilt Angle for Full Gray Scale Generation", Ferroelectrics, 114, 137–150 (1991); A. B. Davey and W. A. Crossland "Potential and Limitations of the Electroclinic Effect in Device Applications", Ferroelectrics, 114, 101–112 (1991)). The reason for this is that the optical state of the electro-optic material of the present invention is more a function of the rotation of separated molecules 20 and less a function of the collective movement of liquid crystal molecules 10, as is the case when working with chiral smectic C* liquid crystals in surface-stabilized ferroelectric liquid crystal components, or in electro-optic components based on the chiral smectic A* phase in the orthogonal bookshelf arrangement. Therefore, it is even possible to reduce the switching times in the electro-optic material of the present invention down to the nanosecond range.

Figure 3:
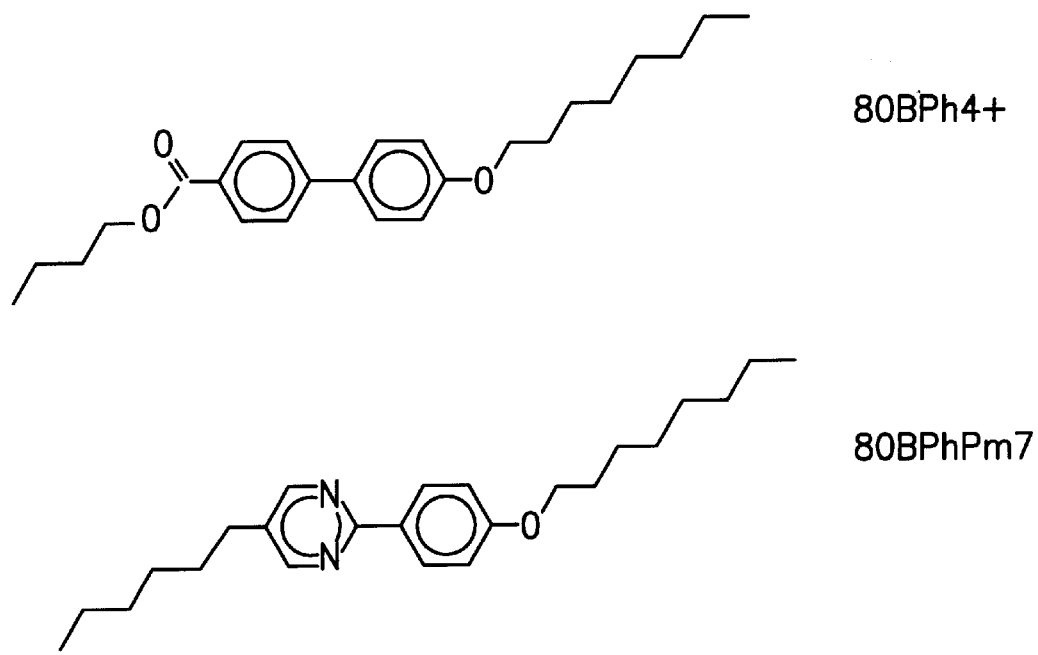
FIG. 3 the structure of two molecular components which form the lamellar liquid crystal.
Figure 4:
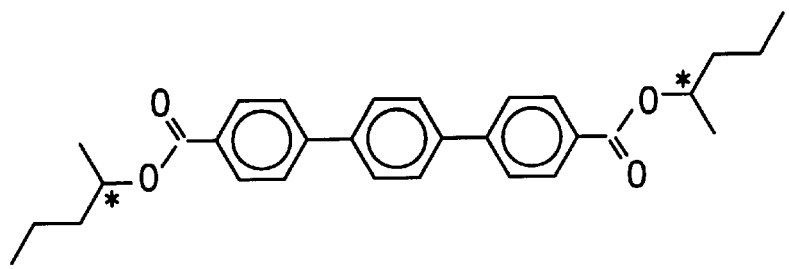
FIG. 4 the structure of a molecule, which is introduced as chiral dopant into the lamellar liquid crystal according to FIG. 3.
Figure 5:
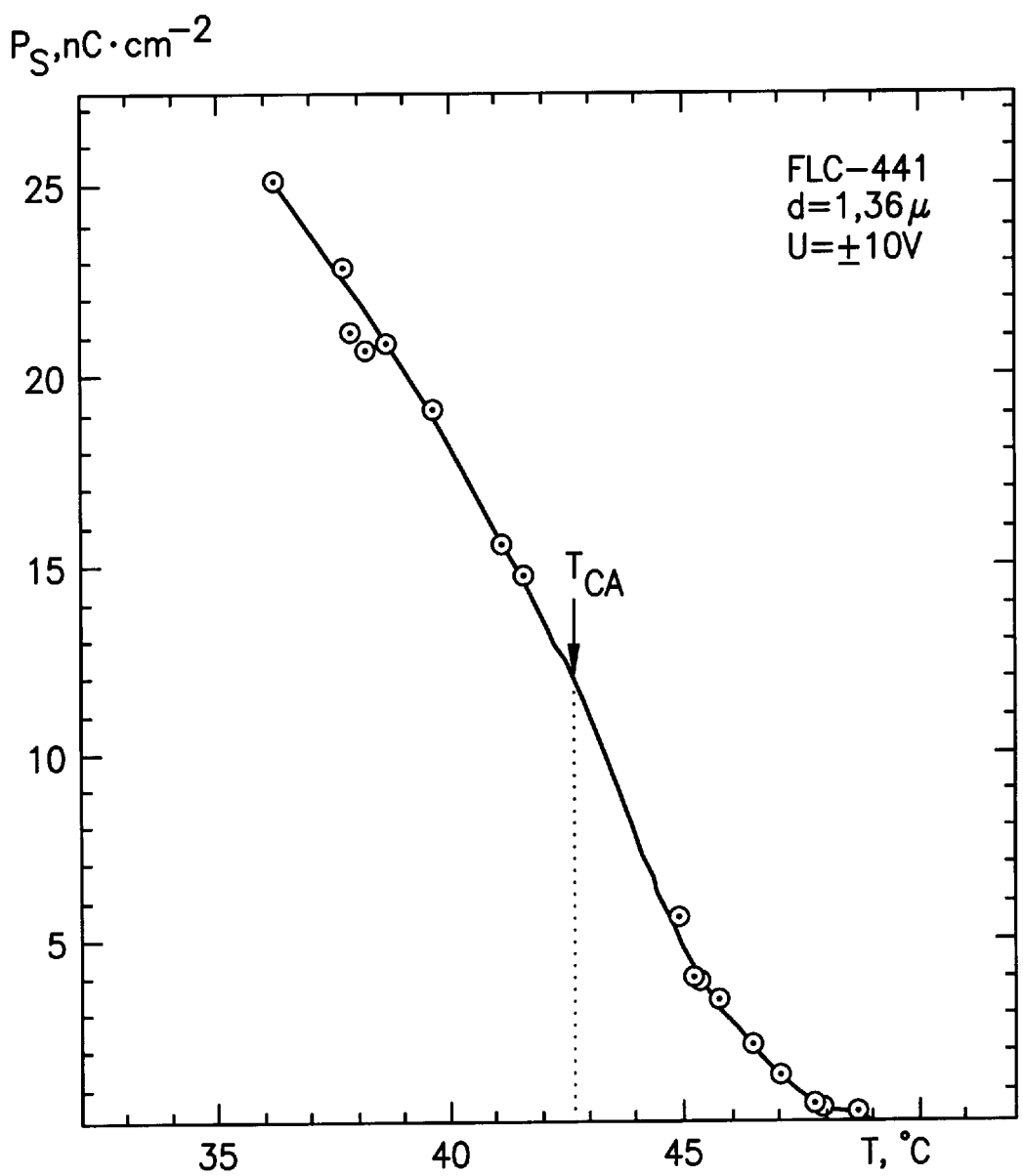
FIG. 5 the temperature dependency of the spontaneous polarization $P_S$ of the electro-optic material, with the structures shown in FIGS. 3 and 4.
Figure 6:
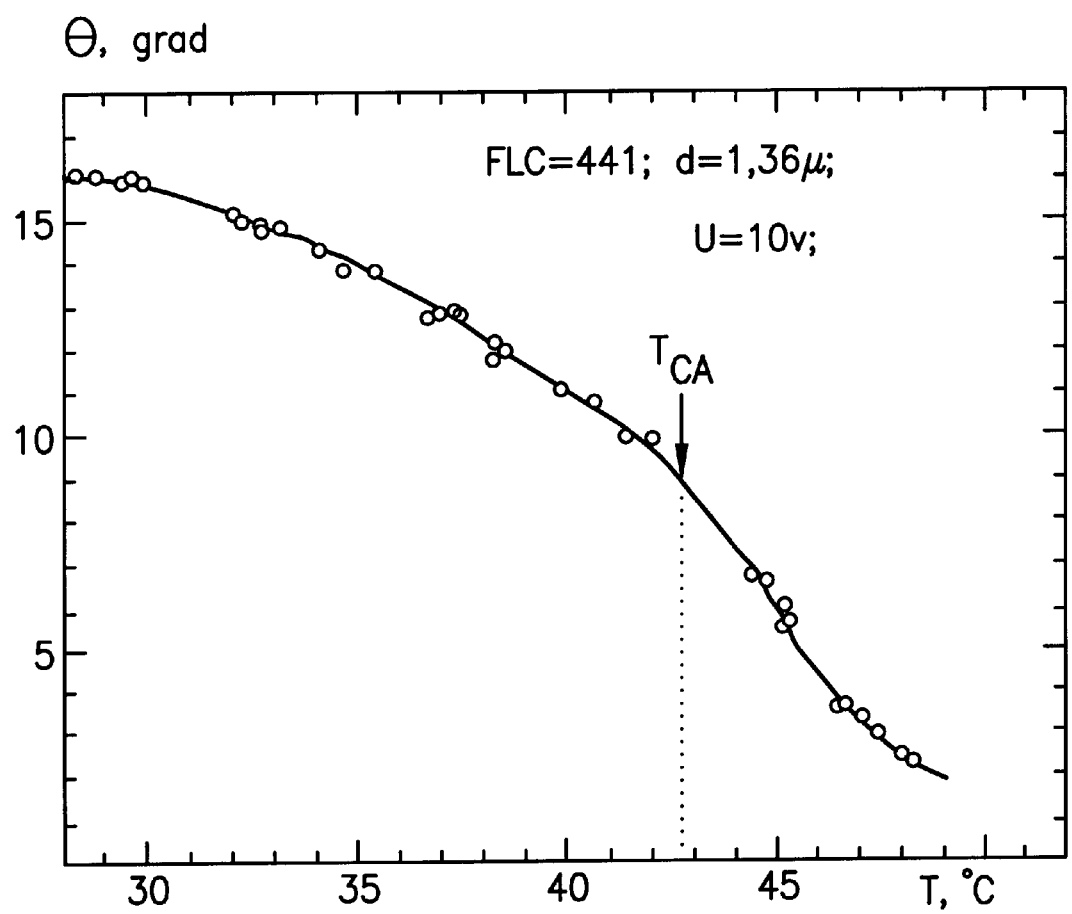
FIG. 6 the temperature dependency of the angle of inclination θ of the electro-optic material.
Figure 7:
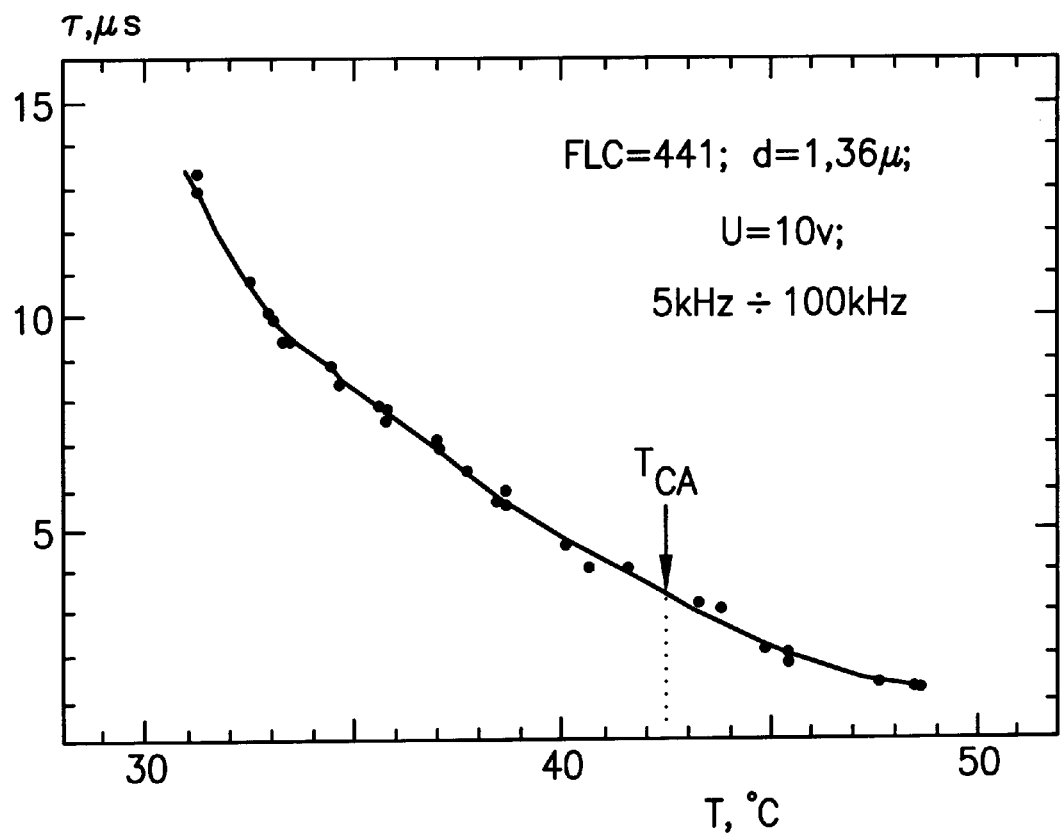
FIG. 7 the temperature dependency of the switching time τ of the electro-optic material.
Figure 8:
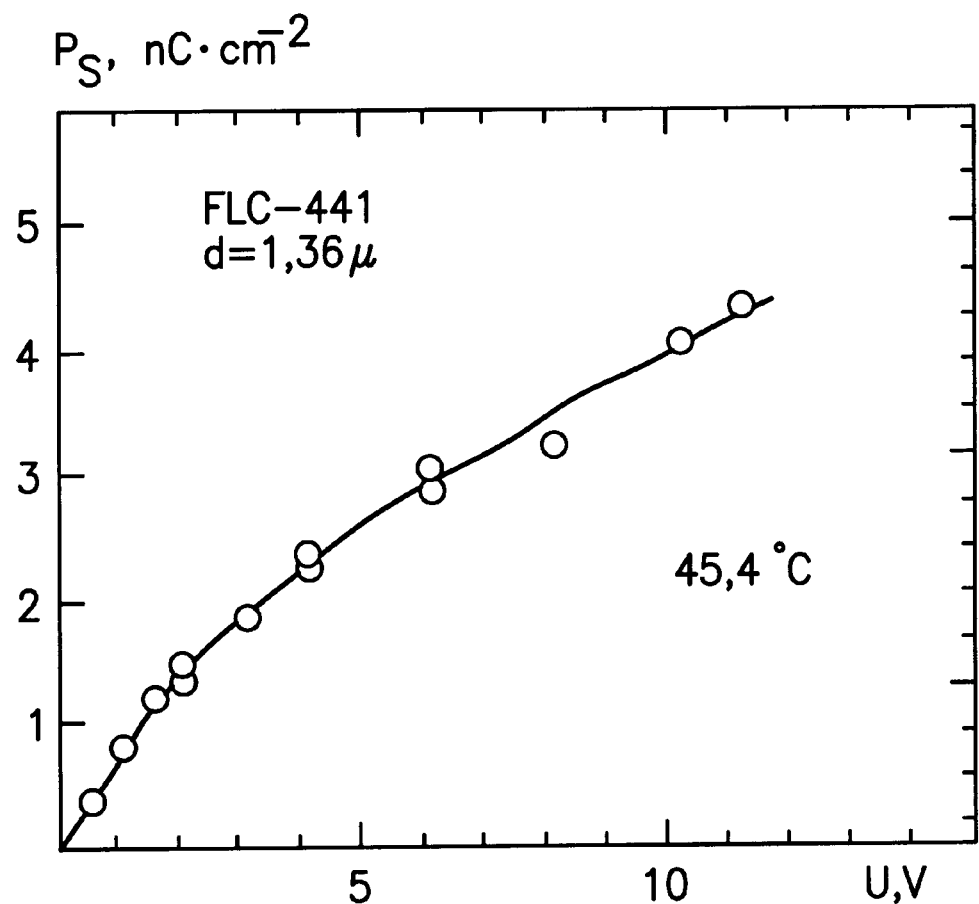
FIG. 8 the voltage dependency of the spontaneous polarization of the electro-optic material, with the structures shown in FIGS. 3 and 4, at a constant temperature for the smectic A-phase.
Figure 9:
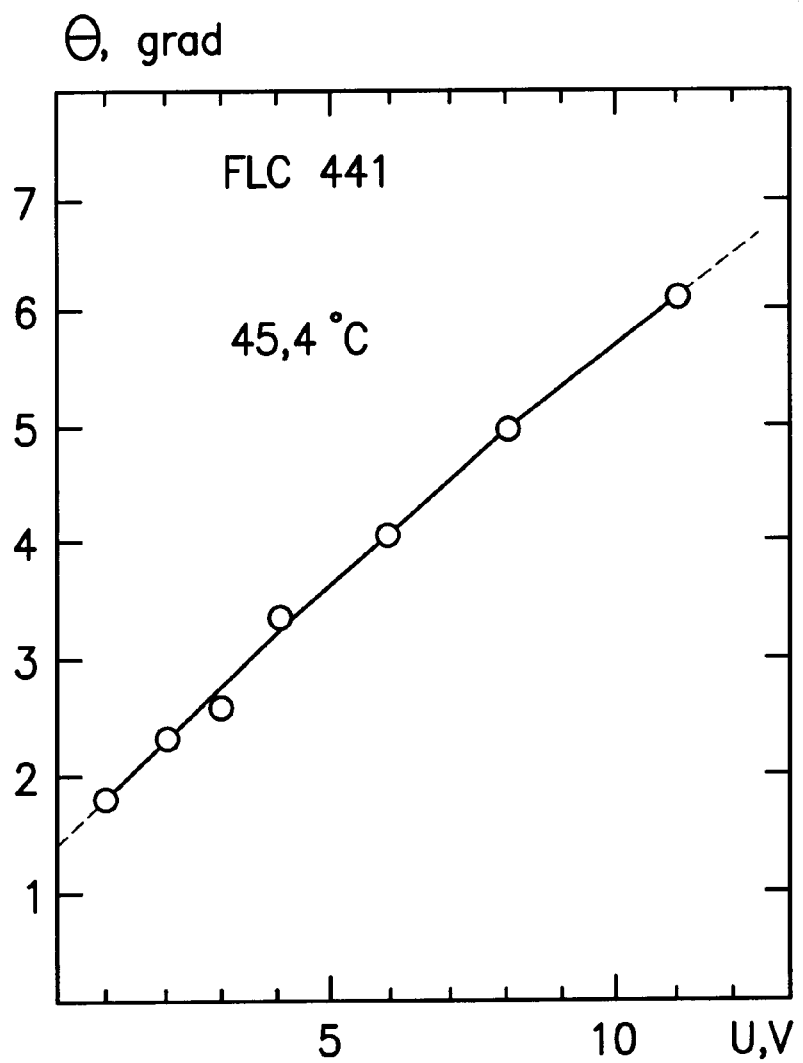
FIG. 9 the voltage dependency of the angle of inclination θ of the electro-optic material.
Figure 10:
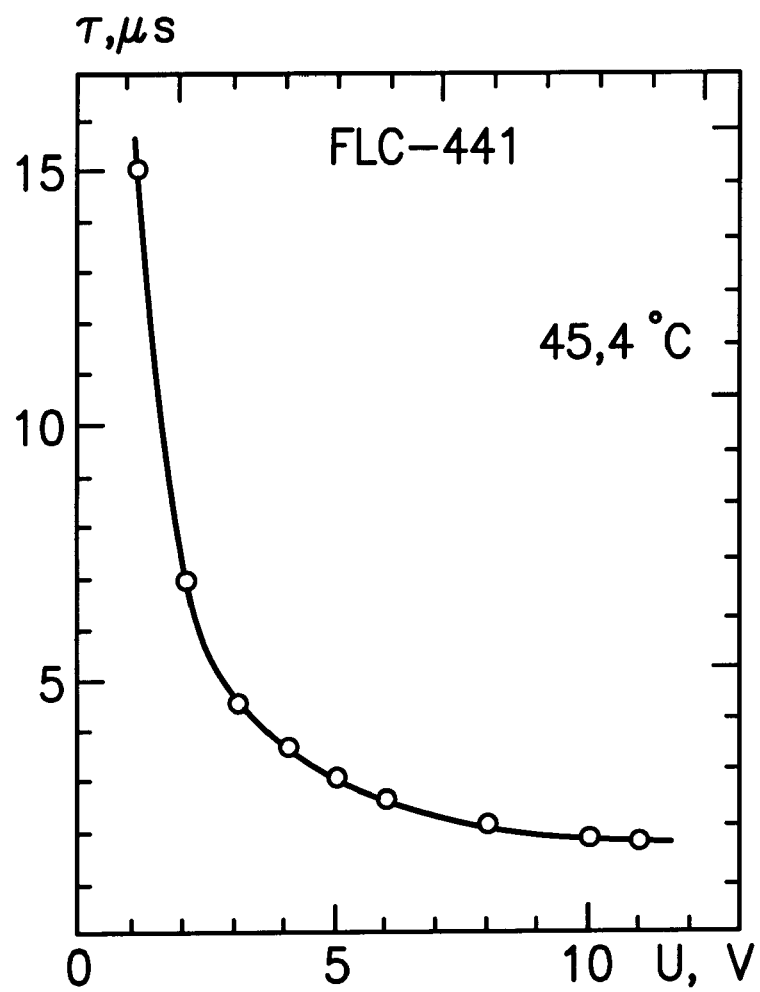
FIG. 10 the voltage dependency of the switching time τ of the electro-optic material.
Figure 11:
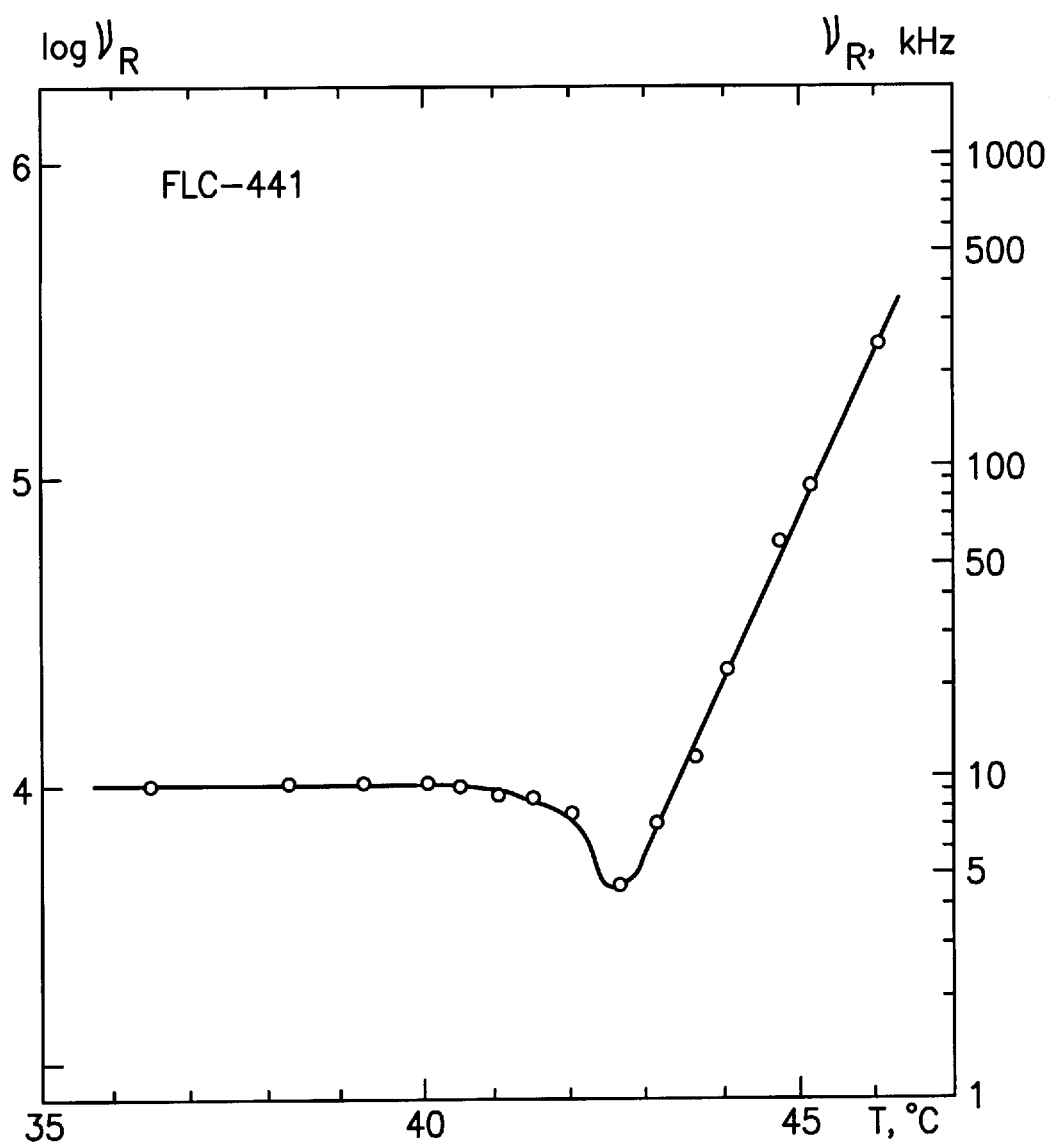
FIG. 11 the temperature dependency of the relaxation frequency $V_R$ (T) near the phase transition smectic C—smectic A of the electro-optic material.

The mode of action of the electro-optic material of the present invention was able to be demonstrated in a capillary cell, which had been provided with two transparent electrodes and in which the molecules are oriented planarly to the surface of the electrodes. A mixture of non-chiral constituents 80 BPh 4 and 80 PhPm7 was used as lamellar liquid crystal. The chemical structure of these constituents and therefore the lamellar liquid crystal is shown in FIG. 3. (It being understood that the carbon and hydrogen atoms are shown schematically). This lamellar liquid crystal comprises a smectic A-phase. Chiral molecules, whose structure is shown in FIG. 4, were introduced as dopant into the lamellar liquid crystal. The locations marked by asterisks (*) each indicate a chiral center of chiral molecule 30. The final composition was made up of 45% by weight of the constituent 80 Bph4, 45% by weight of the constituent 80 PHPm7 and 10% parts by weight of chiral molecules. The orthogonal smectic A-phase of this electro-optic material is present from 40.5° C. to 75° C. The temperature 40.5° C. of the transition from the smectic C*-phase into the smectic A*-phase was defined as the temperature at which a helical structure appears, and as the temperature, at which the dielectric absorption $\in''$ shows a maximum in the complex dielectric constant. For the latter measurements, an oscillating voltage of 0.1 V and a cell thickness of 1.5 μm were used. Through application of a double thermal gradient during the cooling of the liquid crystal from the isotropic to the smectic A*-phase, one was able to achieve a high optic uniformity, accompanied by an average contrast of 100 on a surface on the order of 1 cm² for the planarly oriented liquid crystal layer. In this context, the first gradient ran transversely to the transparent plate and the second gradient ran along the liquid crystal layer. A parallel rubbed polyvinyl alcohol coating, applied by spin-on deposition, was used to pre-orient the liquid crystal. The induced electric polarization $P_S$ was measured by means of the technique described by K. Miyasato, S. Abe, H. Takezoe, A. Fukuda and E. Kuze (Jap. J. Appl. Phys., 22, L661 (1983)) using phase-to-phase voltage. In FIG. 5, the temperature dependency of the spontaneously induced polarization $P_F$ is shown, given a cell thickness of 1.36 μm and an applied voltage of ±10 V. The induced angle of inclination θ of the optical indicatrix was determined in accordance with the method proposed by V. A. Baikalov, L. A. Beresnev and L. M. Blinov (Mol. Cryst. Liq. Cryst., 127, 397 (1985)). For that, the capillary cell was secured to a rotationally mounted microscope table between crossed polarizers and the angular difference between two positions measured with minimal transmission, which positions corresponded to the two opposite polarities of the applied square-wave voltage of 5–30 KHz. The thus measured temperature dependency of angle of inclination θ of the mixture is shown in FIG. 6. The rise and decay time τ of the electro-optic response signal from the capillary cell was measured with oscillograms showing between 10 and 90% of the maximum response. In FIG. 7, the switching time τ is plotted as a function of the temperature. The values of the electric, spontaneous polarization $P_S$, of the angle of inclination θ of the mixture, and of the response time τ were measured as a function of the applied voltage at a constant temperature of T=45.4° C. and in the smectic A*-phase of the material of the present invention. The measuring results are shown in FIGS. 8, 9 or 10. The angle of inclination $\theta_m \neq 0$ of the chiral molecules in the smectic A liquid crystal was determined by extrapolating the voltage dependency of the angle of inclination θ of the mixture down to a voltage of 0 V. For θ(0V), a value of about 1.5° (see FIG. 9) was obtained. From this, a molecular angle of inclination $\theta_m$ of about 15° was able to be estimated, allowing for the 10% concentration of chiral molecules 20 and comparable refractive indices for the chiral dopant and the lamellar liquid crystal. The voltage dependency of the response time or switching time τ of the electro-optic material is shown in FIG. 10. It is characteristic of the reorientation of tilted chiral molecules on a cone (see FIG. 2a, reference symbol 35), which corresponds to the response times in chiral smectic C-phases. In the electro-optic material described here, however, the reorientation takes place in the smectic A liquid crystal cell doped with tilted chiral molecules. The molecular nature of the reorientation likewise follows in the same way from the temperature dependency of the relaxation frequencies $v_R(T)$, which follow from the dielectric relaxation spectra of the material shown in FIG. 4 (see FIG. 11). The measured exponential characteristic curve of the relaxation frequencies is characteristic of molecular relaxation processes. In contrast, for collective relaxation processes, such as soft mode or Goldstone mode, Curie-Weiss performance characteristics $v_R \sim (T-T_C)$ would be expected.

The electro-optic material of the present invention can be used in electro-optic components, in which the material is embedded, for example, between electrodes and light-polarizing layers. Capillary cells, as already mentioned, comprise one possible arrangement.

What is claimed is:

1. An electro-optic material whose optical properties may be changed by applying an external electric field comprising:

a lamellar liquid crystal structure having a surface and a plurality of first molecules; and a plurality of chiral molecules located in the lamellar liquid crystal at a predefined concentration, the chiral molecules having longitudinal axes longer than longitudinal axes of the first molecules, the longitudinal axes of the chiral molecules being tilted, without an external electric field, by a predefined angle with respect to a layer normal, the layer normal being perpendicular to the surface.

2. The electro-optic material as recited in claim 1 wherein each chiral molecule has at least one chiral center with a dipole element, which is disposed transversely to the layer normal and which assumes a preferred direction in response to an application of an external electric field.

3. The electro-optic material as recited in claim 1 wherein the lamellar liquid crystal structure is in a thermotropic smectic phase.

4. The electro-optic material as recited in claim 1 wherein the lamellar liquid crystal structure is in an orthogonal smectic phase.

5. The electro-optic material as recited in claim 4 wherein the lamellar liquid crystal structure is in an achiral smectic C-phase.

6. The electro-optic material as recited in claim 4 wherein the lamellar liquid crystal structure is in a chiral smectic C-phase.

\* \* \* \* \*